United States Patent [19]
Upton

[11] Patent Number: 5,423,567
[45] Date of Patent: Jun. 13, 1995

[54] TRACTOR TRAILER FIFTH WHEEL LEVER/CABLE ASSEMBLY

[76] Inventor: Bobby R. Upton, Rte. 1 Box 575 I, Texarkana, Ark. 75502

[21] Appl. No.: 188,688

[22] Filed: Jan. 31, 1994

[51] Int. Cl.⁶ .............................................. B62D 53/08
[52] U.S. Cl. .................... 280/433; 254/129; 254/131; 294/17
[58] Field of Search .......................... 280/433; 294/17; 254/129, 131

[56] References Cited
U.S. PATENT DOCUMENTS
4,991,893 2/1991 Gordon et al. .................. 294/17

FOREIGN PATENT DOCUMENTS
78166 2/1951 Norway .......................... 254/131

Primary Examiner—Mitchell J. Hill

[57] ABSTRACT

A tractor trailer fifth wheel for unlatching a fifth wheel on a tractor trailer comprising an elongated rod having two free ends and wedge secured to the rod near one free end to project outwards therefrom to be positioned against an external object; a cable having one end coupled to the rod and the other end extending a distance therebeyond; and a hook secured to the end of the cable remote from the rod for attachment to a latch of a fifth wheel, whereby attaching the hook to the latch, positioning the wedge at a lower portion of a vehicle to act as a fulcrum, and reciprocating the rod about the wedge as a lever will allow the rod to be pivoted to loosen the latch.

4 Claims, 4 Drawing Sheets

TRACTOR TRAILER FIFTH WHEEL LEVER/CABLE ASSEMBLY

BACKGROUND OF THE INVENTION

1. Field of the Invention

The present invention relates to a tractor trailer fifth wheel lever/cable assembly and more particularly pertains a tractor trailer fifth wheel lever/cable assembly for unlatching the fifth wheel of a tractor trailer.

2. Description of the Prior Art

The use of manipulating levers and cables is known in the prior art. More specifically, manipulating levers and cables heretofore devised and utilized for the purpose of unlatching components of mechanical mechanisms are known to consist basically of familiar, expected and obvious structural configurations, notwithstanding the myriad of designs encompassed by the crowded prior art which have been developed for the fulfillment of countless objectives and requirements.

By way of example, U.S. Pat. Nos. 307,734 to Ethridge discloses a fifth wheel latch release hook, 4,162,803 to Rolfes discloses a latch release device, 4,201,410 to Crawford et al. discloses release hook assemblies, 4,227,713 to Blodgett, Jr. et al. discloses a trailer hitch latching assembly, and 5,108,139 to Leech discloses a device for remotely actuating the safety latch of a hoist hook.

While these devices fulfill their respective, particular objective and requirements, the aforementioned patents do not describe a tractor trailer fifth wheel lever/cable assembly that includes a wedge acting as a fulcrum and reciprocating rod acting as a lever for loosening the latch of the fifth wheel.

In this respect, the tractor trailer fifth wheel lever/cable assembly according to the present invention substantially departs from the conventional concepts and designs of the prior art, and in doing so provides an apparatus primarily developed for the purpose of unlatching the fifth wheel of a tractor trailer.

Therefore, it can be appreciated that there exists a continuing need for new and improved tractor trailer fifth wheel lever/cable assembly which can be used for unlatching the fifth wheel of a tractor trailer. In this regard, the present invention substantially fulfills this need.

SUMMARY OF THE INVENTION

In the view of the foregoing disadvantages inherent in the known types of manipulating levers and cables now present in the prior art, the present invention provides an improved tractor trailer fifth wheel lever/cable assembly . As such, the general purpose of the present invention, which will be described subsequently in greater detail, is to provide a new and improved tractor trailer fifth wheel lever/cable assembly and method which has all the advantages of the prior art and none of the disadvantages.

To attain this, the present invention essentially comprises an elongated rod of a rigid material having two free ends with an upper and lower extent therebetween, a pair of apertures extending diametrically therethrough between the upper and lower extent thereof, a wedge having a flat surface secured to the upper extent at one free end to project outwards therefrom and be coextensively aligned with the apertures and a curved surface remote from the rod adapted to be positioned against an external object; a cable in a loop configuration of an extensible material extending through the apertures and to a distance therebeyond greater than the length of the rod; and a hook secured to the loop remote from the apertures for attachment to a latch of a fifth wheel, whereby attaching the hook to the latch, positioning the curved extent of the wedge at a lower portion of a vehicle to act as a fulcrum, and reciprocating the rod at the lower extent about the wedge as a lever will allow the rod to be pivoted to loosen the latch.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved tractor trailer fifth wheel lever/cable assembly which has all the advantages of the prior art manipulating levers and cables and none of the disadvantages.

It is another object of the present invention to provide a new and improved tractor trailer fifth wheel lever/cable assembly which may be easily and efficiently manufactured and marketed.

It is a further object of the present invention to provide a new and improved tractor trailer fifth wheel lever/cable assembly which is of durable and reliable construction.

An even further object of the present invention is to provide a new and improved tractor trailer fifth wheel lever/cable assembly which is susceptible of a low cost of manufacture with regard to both materials and labor, and which accordingly is then susceptible of low prices of sale to the consuming public, thereby making such a tractor trailer fifth wheel lever/cable assembly economically available to the buying public.

Still yet another object of the present invention is to provide a new and improved tractor trailer fifth wheel lever/cable assembly which provides in the apparatuses and methods of the prior art some of the advantages thereof, while simultaneously overcoming some of the disadvantages normally associated therewith.

Even still another object of the present invention is to provide a new and improved tractor trailer fifth wheel lever/cable assembly for unlatching the fifth wheel of a tractor trailer.

Even still another object of the present invention is to provide a new and improved tractor trailer fifth wheel lever/cable assembly for simplifying the tedious task of unlatching a fifth wheel on a tractor trailer.

Even still another object of the present invention is to provide a new and improved tractor trailer fifth wheel lever/cable assembly that provides a safe way to release the latch, reducing the possibility of the trailer shifting and causing personal injury.

Even still another object of the present invention is to provide a new and improved tractor trailer fifth wheel lever/cable assembly that includes a wedge acting as a fulcrum and reciprocating rod acting as a lever for loosening the latch of a fifth wheel.

Even still another object of the present invention is to provide a new and improved tractor trailer fifth wheel lever/cable assembly that may be easily operated and transported.

Even still another object of the present invention is to provide a new and improved tractor trailer fifth wheel lever/cable assembly that can be utilized in a portable manner or permanently affixed to a vehicle.

Lastly, it is an object of the present invention is to provide a new and improved tractor trailer fifth wheel lever/cable assembly comprising an elongated rod having two free ends and wedge secured to the rod near one free end to project outwards therefrom to be positioned against an external object; a cable having one end coupled to the rod and the other end extending a distance therebeyond; and a hook secured to the end of the cable remote from the rod for attachment to a latch of a fifth wheel, whereby attaching the hook to the latch, positioning the wedge at a lower portion of a vehicle to act as a fulcrum, and reciprocating the rod about the wedge as a lever will allow the rod to be pivoted to loosen the latch.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
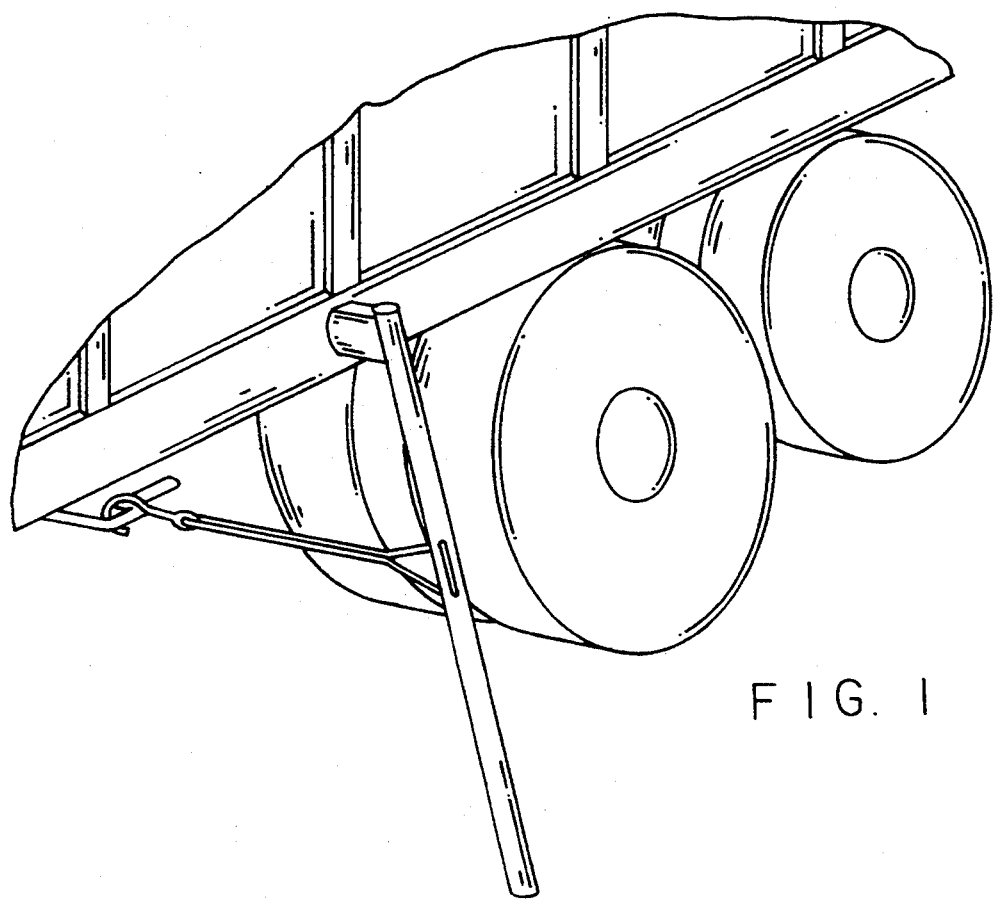
FIG. 1 is a perspective view of the preferred embodiment of the tractor trailer fifth wheel lever/cable assembly constructed in accordance with the principles of the present invention.
Figure 2:
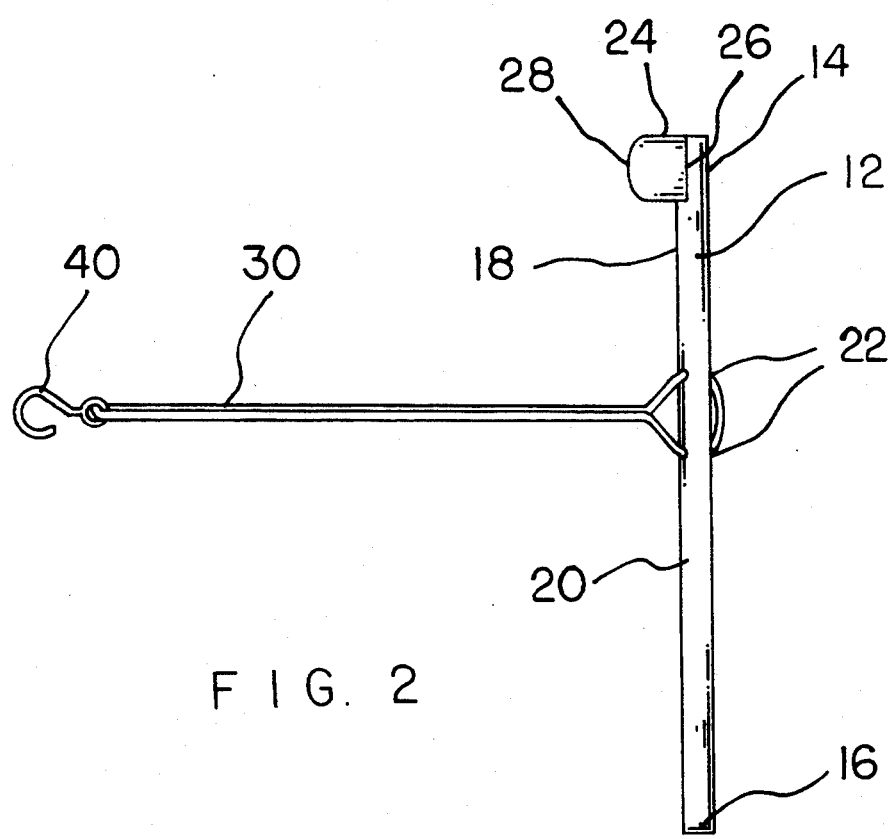
FIG. 2 is a front elevational view of the device shown in FIG. 1.
Figure 3:
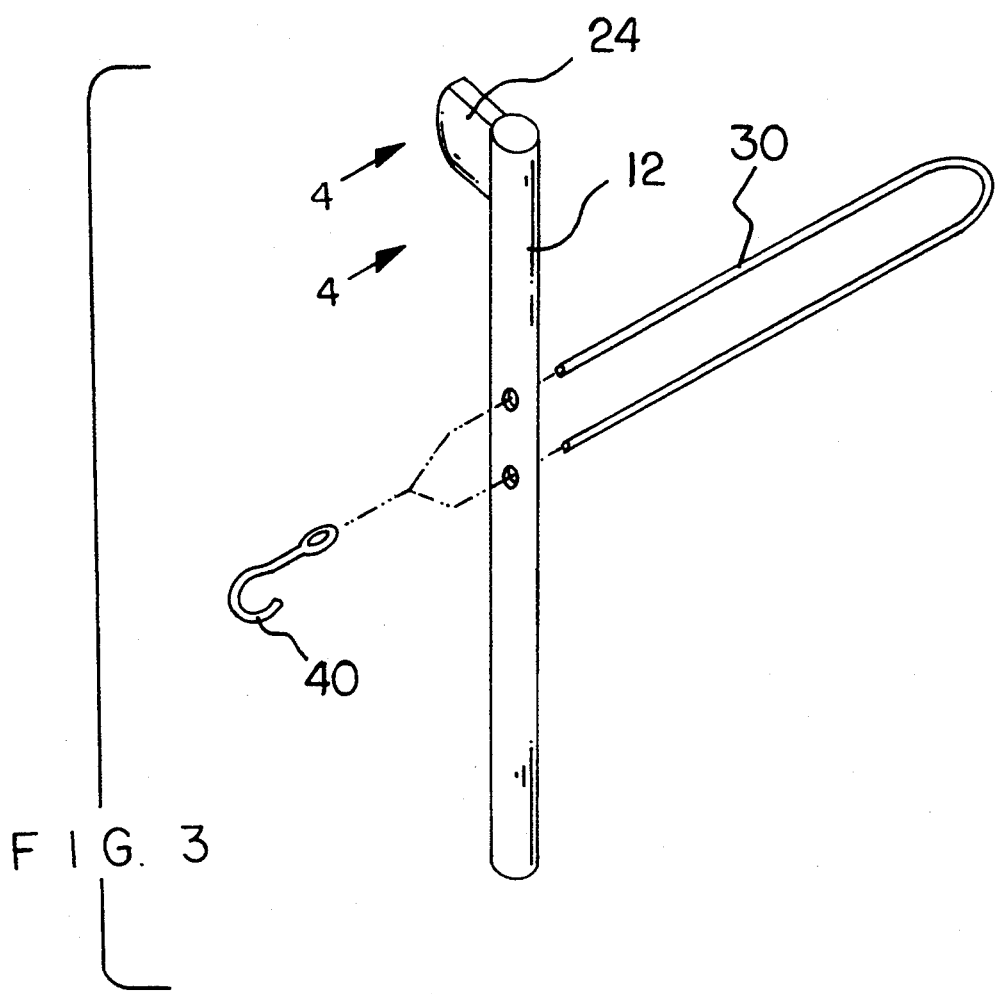
FIG. 3 is a perspective illustration of the components of the present invention.
Figure 4:
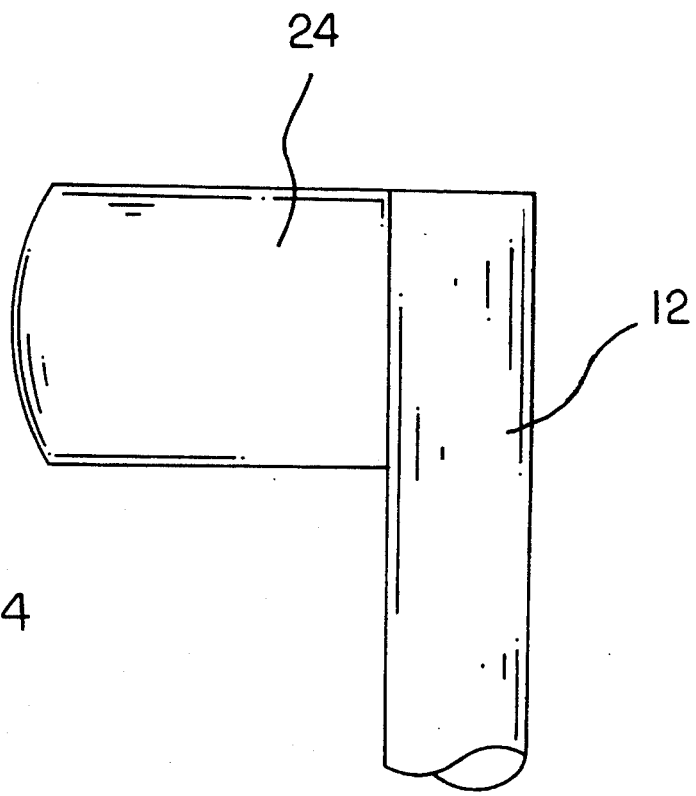
FIG. 4 is a front elevational view of the upper portion of the lever taken along the line 4—4 of FIG. 3.

With reference now to the drawings, and in particular, to FIG. 1 thereof, the preferred embodiment of the new and improved tractor trailer fifth wheel lever/cable assembly embodying the principles and concepts of the present invention and generally designated by the reference number 10 will be described.

Specifically, the present invention includes 3 major components. The major components are the rod, the cable and the hook. These components are interrelated to provide the intended function.

More specifically, it will be noted in the various Figures that the first major component is the rod 12. The rod is composed of a rigid material and has two free ends 14,16. The rod includes an upper extent 18 and a lower extent 20 extending between the two free ends. The rod includes a pair of apertures 22 extending diametrically therethrough between the upper and lower extent thereof. The apertures are sized in order to receive a cable. The rod includes a wedge 24. The wedge has a flat surface 26 secured to the upper extent at one free end. The wedge projects outwards from the rod and is coextensively aligned with the apertures. The wedge includes a curved surface 28 remote from the rod. The curved surface is adapted to be positioned against an external object to act as a fulcrum.

The second major component is the cable 30. The cable is formed in a loop configuration of an extensible material such as metal wire or fabric rope. The cable extends through the apertures and to a distance therebeyond greater than the length of the rod. The cable is adapted to transfer forces applied to the rod to that which it is attached.

The third major component is the hook 40. The hook is secured to the cable remote from the apertures and cable loop for attachment to a latch of a fifth wheel. When the hook is attached to the latch, the curved extent 28 of the wedge is positioned adjacent to a lower portion of the vehicle to act as a fulcrum, and the rod 12 is reciprocated at the lower extent thereof about the wedge 24 as a lever, the rod will pivot and transfer force used to loosen the latch.

Figure 5:
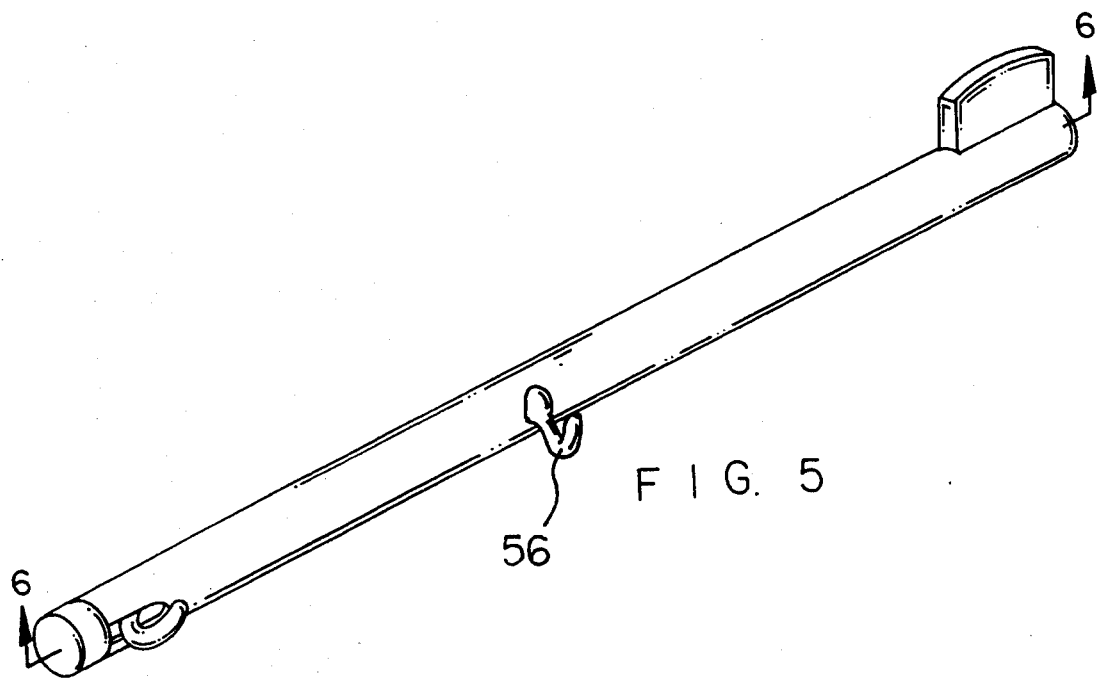
FIG. 5 is a perspective view of an alternate embodiment of the present invention.
Figure 6:
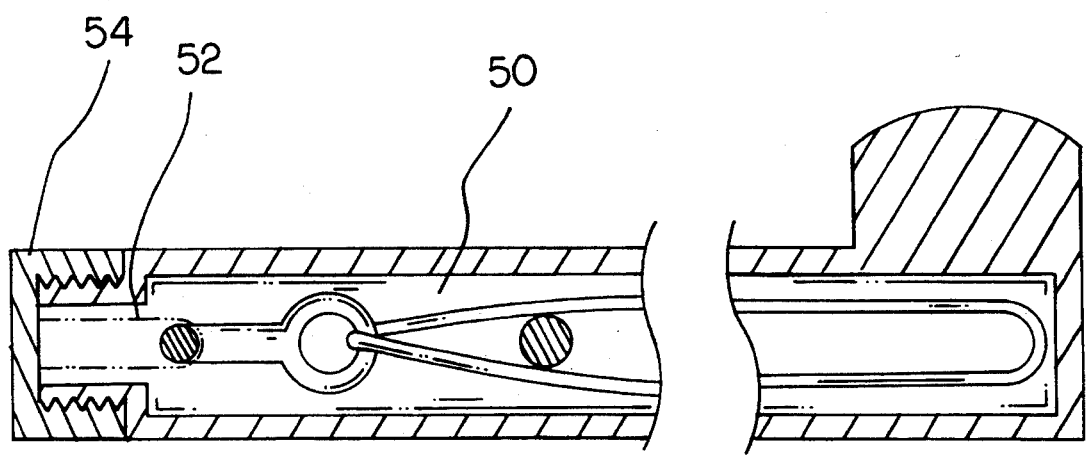
FIG. 6 is a view of the alternate embodiment of the present invention taken along the line 6—6 of FIG. 5.

A second embodiment of the present invention is shown in FIGS. 5 and 6 and includes substantially all of the components of the present invention further including a rod that has a hollow interior 50, an opening 52 therein for holding the cable and hook in a stowed configuration. The rod includes a cap 54 for sealing the opening of the rod when the cable and hook have been placed therein. The rod further includes a pivot hook 56 offset from the cap for receiving the extended end of the cable. When the hook is coupled to the latch, the cable is extended through the pivot hook, and the rod is reciprocated, the pivot hook acts as an intermediate pivot point that transfers force from the rod to loosen the latch.

Figure 7:
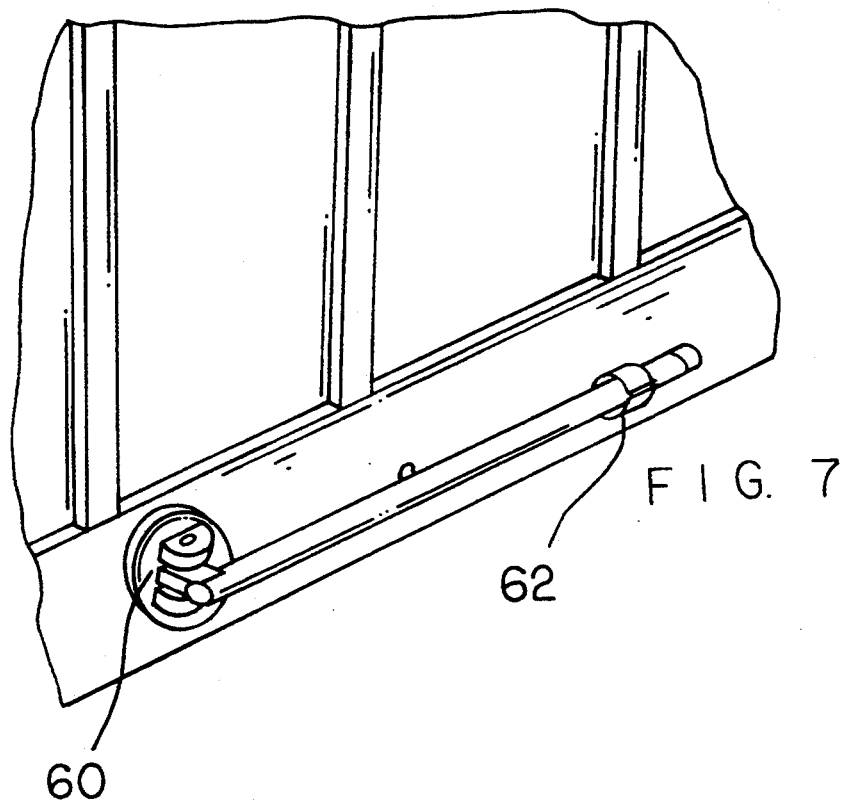
FIG. 7 is a perspective view of yet another embodiment of the present invention.
Figure 8:
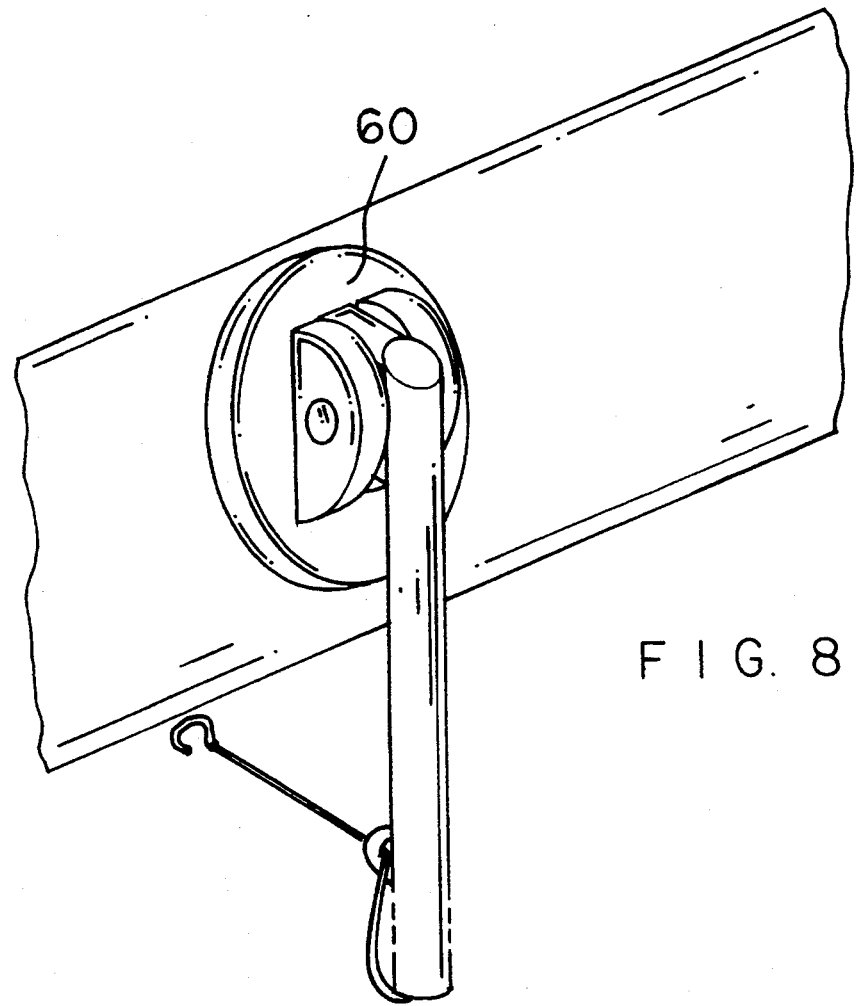
FIG. 8 is a view of the coupling mechanism of the alternate embodiment of FIG. 7.

A third embodiment of the present invention is shown in FIGS. 7 and 8 and includes substantially all of the components of the present invention further including means 60 for coupling the wedge to the lower portion of the vehicle, and means 62 for coupling the rod to the lower portion of the vehicle to define a stowed configuration therefor.

The present invention provides a means for an operator to reach the release latch of a fifth wheel and apply a sufficient force to easily open it. Unlatching the fifth wheel on a tractor trailer can be a tedious task, especially if the release is hard to operate or is jammed. The operator must usually extend an arm and reach into a narrow gap between the trailer and the fifth wheel to grasp and pull the release handle. This can be difficult, more so in inclement weather when the footing may be slippery. Clothing can become caked with the grease from the fifth wheel or the surrounding supporting structure. There is also the possibility that the trailer can shift or move when the release is opened, increasing the risk of personal injury. The present invention offers an alternate and safe way to release the latch. In the preferred embodiment the rod is approximately 30 inches in length and has holes disposed therethrough adapted to be secured to a wire rope cable. The cable is 36 inches in length and attaches to the rod through the holes. The length of cable can be modified to provide more or less leverage when using the rod. The hook is made of steel and attaches to the release handle on the fifth wheel latch assembly. The present invention can be portably attached each time the operator wishes to release the fifth wheel or, it may be securely mounted to the rear or side of the vehicle's frame. Both of these methods are effective and greatly reduce the stress and strain that can result from an operator manually pulling on a stubborn or frozen latch.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A new and improved tractor trailer fifth wheel lever/cable assembly for unlatching a latch securing a fifth wheel on a tractor trailer comprising, in combination:

an elongated rod of a rigid material having two free ends with an upper and lower extent therebetween, a pair of apertures extending diametrically therethrough between the upper and lower extent thereof, a wedge having a flat surface secured to the upper extent at one free end to project outwards therefrom and be coextensively aligned with the apertures and a curved surface remote from the rod adapted to be positioned against a lower portion of a vehicle;

a cable in a closed loop configuration of an extensible material extending through the apertures and to a distance therebeyond greater than the length of the rod; and a hook secured to the loop remote from the apertures for attachment to a latch of a fifth wheel, whereby attaching the hook to the latch, positioning the curved extent of the wedge at a lower portion of a vehicle to act as a fulcrum, and reciprocating the rod at the lower extent about the wedge as a lever will allow the rod to be pivoted to loosen the latch.

2. The device as set forth in claim 1 further including means for rotatably coupling the wedge to a lower portion of a vehicle.

3. The device as set forth in claim 1 further including means for coupling the rod to a lower portion of a vehicle to define a stowed configuration.

4. A tractor trailer fifth wheel for unlatching a latch securing a fifth wheel on a tractor trailer comprising:

an elongated rod having two free ends, said rod having a hollow interior and an opening for holding the cable, a cap for removably sealing the opening, and a wedge secured to the rod near one free end and projected outwards therefrom for positioning against a lower portion of a vehicle;

a cable having one end coupled to the rod and the other end extending a distance therebeyond; and a hook secured to the end of the cable remote from the rod for attachment to a latch of a fifth wheel and;

a pivot hook offset from the cap for receiving the extended end of cable.

* * * * *